Feb. 25, 1930.   P. R. TUCKER   1,748,431
MANURE SPREADER
Original Filed June 21, 1924   2 Sheets-Sheet 1

INVENTOR.
Pinkney R. Tucker
BY
ATTORNEY.

Feb. 25, 1930.　　　P. R. TUCKER　　　1,748,431
MANURE SPREADER
Original Filed June 21, 1924　　2 Sheets-Sheet 2

INVENTOR.
Pinkney R. Tucker
BY Henry Orth
ATTORNEY.

Patented Feb. 25, 1930

1,748,431

UNITED STATES PATENT OFFICE

PINKNEY RUFFIN TUCKER, OF GREENSBORO, NORTH CAROLINA, ASSIGNOR TO L. F. BRUNT AND L. C. MELCHOR, BOTH OF GREENSBORO, NORTH CAROLINA

MANURE SPREADER

Original application filed June 21, 1924, Serial No. 721,447. Divided and this application filed September 7, 1927. Serial No. 218,007.

My invention relates to one-horse, two-wheel and row manure spreaders, and has for its object a novel construction and arrangement of the unloading mechanism, being a division of my Patent No. 1,642,798, dated September 20, 1927.

I believe it to be novel to provide a chain drag, mounted on and operated by a shaft passing through the body of the manure spreader and brought into and out of operative position by means of a hand lever mounted on the rear of the two-wheeled cart, so that the lifting power will be applied by a pull directly through a link or flexible connection from the hand lever to the unloading device from the rear of the cart.

Other details of construction and arrangement of parts will hereinafter be particularly described and claimed.

Referring to the drawings, in which like parts are similarly designated—

Figure 1:
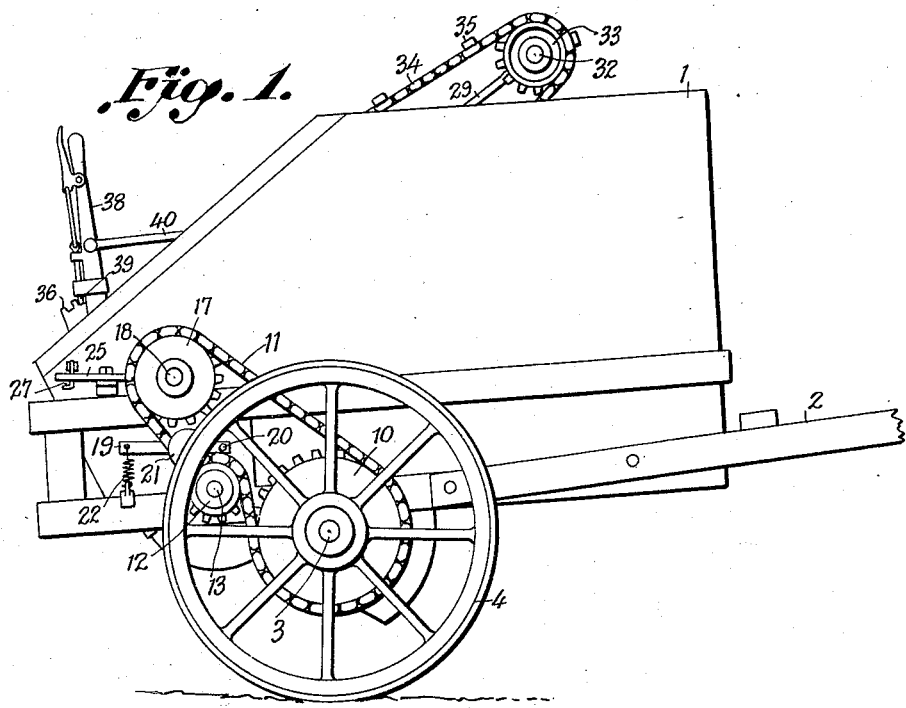
Figure 1 is a side view of so much of a manure spreader as will be necessary for an understanding of my invention.
Figure 2:
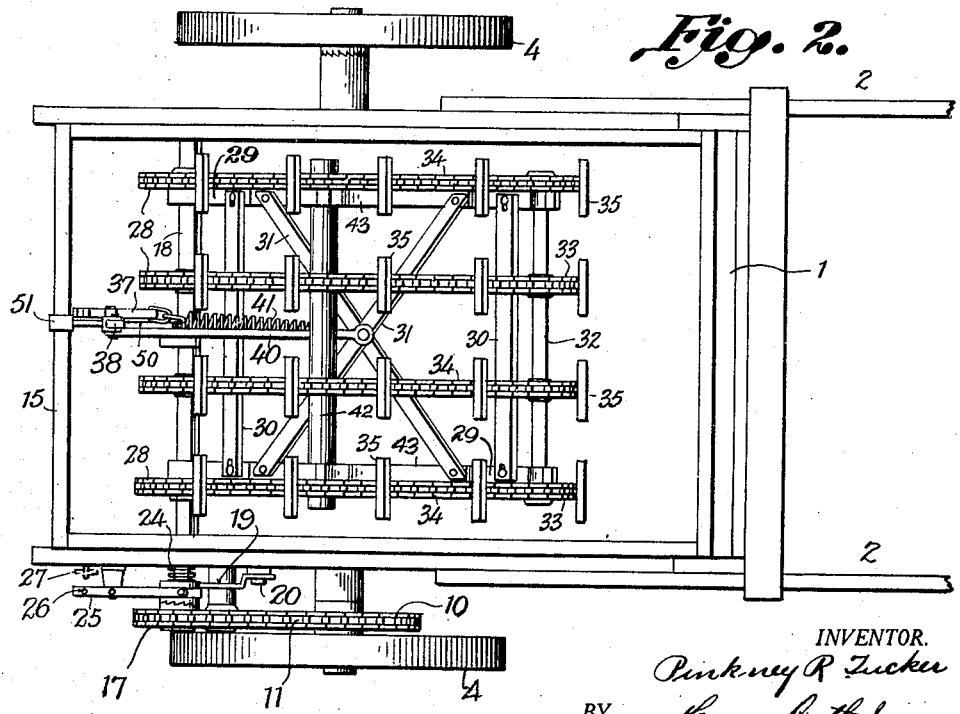
Fig. 2 is a plan view thereof.
Figure 3:
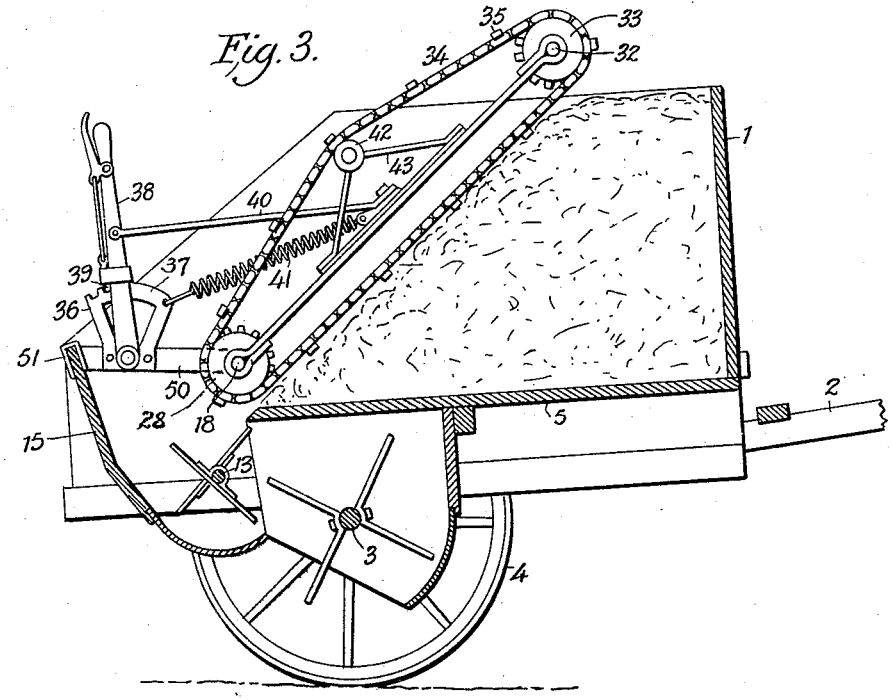
Fig. 3 is a vertical longitudinal section.

My manure spreader is in the form of a cart, having a body 1, shafts 2, an axle 3 and wheels 4. On the axle is mounted a sprocket wheel 10 driven by one of the wheels 4. This sprocket wheel is provided with a sprocket chain 11 that passes over a sprocket wheel 17 loose on a shaft 18. A chain tightener comprising an arm 19 pivoted on a bolt 20 carrying a roller 21, engages the chain and takes up the slack, maintaining the chain taut. The arm 19 is loaded by a spring 22, and the roller engages the chain between the sprocket wheels 12 and 17.

The loose sprocket wheel 17 is connected to a shaft 18 by a clutch whose movable support member 23 is urged into driving connection by a spring 24. This member is operated by a shifting arm 25 having a hole 26 in which a hook 27 may be placed to hold the clutch disconnected to temporarily prevent the unloading mechanism from operating while going from barnyard to field. The unloading device has several sprocket wheels 28 secured thereto.

Pivoted at one end on shaft 18 is a frame composed of longitudinal members 29 and adjustable, transverse member 30 and crossed braces 31. At the opposite end of the frame is a shaft 32 carrying sprocket wheels 33, similar to those 28 and similarly spaced.

Over each pair of sprocket wheels 28, 33, is a drag chain 34 provided with any kind of suitable drags 35.

A sector 36 having teeth at its rear portion and a plain arc 37 at its front portion is mounted on the body, as shown. The sector is secured to an iron 50 having an eye supported by shaft 18 and a hook portion 51 engaging over the rear board 15 of the body. A lifting arm 38 provided with the customary hand-operated latch 39 is pivoted to ride over said sector. The arm 38 is connected to the frame by a link 40, preferably at the crossing of the braces 31. A spring 41 is connected between the sector or other stationary part and the frame, to partially relieve the load of the unloading mechanism on the lifting arm.

42 is a roller mounted in brackets 43 for supporting the upper stretches of the drag chains 34, and for tightening said chains.

The operation of my manure spreader is as follows:

Assume the unloading device to be lifted and latched, the body 1 to be loaded, and the clutch 23 held disengaged by hook 27; the unloading device not operating.

When the field is reached and the row straddled by the wheels, the horse walking in a furrow, the latch 39 is released and the frame and drag chains allowed to rest by gravity on the load. The clutch is then thrown into engagement and the drag chains rotated, the lower stretches acting on the surface of the load and gradually delivering the load over the rear edge of the bottom 5.

The latch 39 riding on the untoothed portion 37 of the sector 36 allows the frame and drag chains to lower in accordance with the discharge of the load, until it reaches a position parallel or nearly parallel with the floor 5.

I claim:—

1. In a manure spreader, a body, a gravity-feed unloading mechanism pivoted at one end of said body, in combination with a manually operated lever and latch, a sector therefor having a non-toothed portion, and means directly connecting the unloading mechanism and lever, to raise said mechanism.

2. In a manure spreader, a body and a gravity-feed unloading mechanism pivoted at one end of said body; in combination with a lever and latch, a sector therefor having a non-toothed portion, a spring to partially counteract the weight of said mechanism on the load and lever, and a link connecting said mechanism and lever.

3. In a manure spreader, a body, a rotatable shaft therein, sprocket wheels on said shaft, a frame pivoting on the shaft at one end, a shaft on the opposite end of said frame, sprocket wheels on the latter shaft and drag chains between the sprocket wheels on the two shafts; in combination with a roller mounted on said frame between its ends and arranged to support the upper stretches of the drag chain, a hand lever and a tension member connecting the lever and frame to manually move the frame.

4. In a manure spreader, a body, a gravity-feed unloading mechanism pivoted at one end of said body, in combination with a manually operated lever and latch, a sector therefor, means connected at one end between the ends of the lever and at the other end to said mechanism and a spring sustaining part of the load of said mechanism.

5. In a manure spreader, a body, a gravity-feed unloading mechanism, a driving shaft therefor on which the mechanism pivots, an iron having one end mounted on said shaft and means on the other end to secure it to one end of said body, a sector supported on said iron, a pivoted hand lever co-operating with said sector, and a connecting member attached at one end to said lever and at the other end to a point intermediate the length of the mechanism.

6. In a manure spreader, a body, a gravity-feed unloading mechanism, a driving shaft therefor on which the unloading mechanism pivots, an iron having an eye at one end mounted on said shaft and means at the other end to secure it to one end of said body, a sector supported on said iron, a pivoted hand lever co-operating with said sector, a connecting member attached at one end to said lever and at the other end to a point intermediate the length of the mechanism, and a coil spring having one end supported from the iron and the other end connected to the mechanism to compensate for part of the weight on the mechanism and decrease the pull on said lever when operated to raise the mechanism.

7. In a manure spreader, a body, a gravity-feed unloading mechanism pivoted at one end of said body, in combination with a manually operated lever and latch, a sector therefor and an element connected at one end to the unloading mechanism and at its other end to said lever, said lever acting through said element to raise the mechanism and hold the mechanism elevated by said latch.

8. In a two-wheeled, one horse manure spreader, including a body, a gravity-feed unloading mechanism pivoted in one end of the body and mechanism operated from a wheel to operate the unloading mechanism; a hand lever pivoted to the rear of the pivotal axis of the unloading mechanism, means to hold the lever in different angular positions, and a single element connected at one end to the lever and at the other end to the unloading mechanism, whereby said lever may raise the unloading mechanism by manual operation of the lever.

9. A manure spreader, comprising a wheeled body, a gravity-feed unloading mechanism pivoted in the rear end of the body, a lever pivoted in said rear end, and a single actuating member constituting a support for said unloading mechanism connected with the latter between its ends and between the ends of the lever.

In testimony that I claim the foregoing as my invention, I have signed my name hereto.

PINKNEY RUFFIN TUCKER.